(12) United States Patent
Jordan et al.

(10) Patent No.: US 8,214,376 B1
(45) Date of Patent: Jul. 3, 2012

(54) TECHNIQUES FOR GLOBAL SINGLE INSTANCE SEGMENT-BASED INDEXING FOR BACKUP DATA

(75) Inventors: Kevin Elliott Jordan, Vadnais Heights, MN (US); Annandata Bhaskar Subramanyam, Baner (IN); Devasis Dasgupta, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 403 days.

(21) Appl. No.: 11/967,630

(22) Filed: Dec. 31, 2007

(51) Int. Cl.
*G06F 7/00* (2006.01)
(52) U.S. Cl. ...................................................... 707/755
(58) Field of Classification Search .................. 707/755, 707/736
See application file for complete search history.

(56) References Cited

U.S. PATENT DOCUMENTS

| | | | | |
|---|---|---|---|---|
| 6,345,244 | B1* | 2/2002 | Clark | 704/2 |
| 6,978,367 | B1* | 12/2005 | Hind et al. | 713/167 |
| 2002/0032564 | A1* | 3/2002 | Ehsani et al. | 704/235 |
| 2005/0216669 | A1* | 9/2005 | Zhu et al. | 711/118 |
| 2006/0195830 | A1* | 8/2006 | Smith et al. | 717/151 |
| 2006/0259489 | A1* | 11/2006 | Bernabeu-Auban et al. | 707/9 |

OTHER PUBLICATIONS

Optimized Backup and Recovery for VMware Infrastructure with EMC Avamar, VMware, $EMC^2$, 2007.

* cited by examiner

*Primary Examiner* — Truong Vo
(74) *Attorney, Agent, or Firm* — Wilmer Cutler Pickering Hale and Dorr LLP

(57) ABSTRACT

Techniques for global single instance segment-based indexing are disclosed. In one particular exemplary embodiment, the techniques may be realized as a method for global single instance segment-based indexing for backup data. The method may comprise dividing an item being backed up into segments, generating a fingerprint for each segment, and saving an entry for each segment in an index database. Each entry may comprise the fingerprint for the segment.

17 Claims, 4 Drawing Sheets

TECHNIQUES FOR GLOBAL SINGLE INSTANCE SEGMENT-BASED INDEXING FOR BACKUP DATA

FIELD OF THE DISCLOSURE

The present disclosure relates generally to data storage systems and, more particularly, to techniques for global single instance segment-based indexing for backup data.

BACKGROUND OF THE DISCLOSURE

Typical enterprise computing environments consist of hundreds to thousands of client machines. Client machines may include desktops, laptops, servers and other computing devices. With such a large number of client machines, a huge amount of data is required to be protected. Further, clients may have data stored in CDs, tapes, computer servers, and other media. These data also need to be protected. Additionally, new compliance regulations exist which may require the maintenance of data for long periods of time. This results in an exponential growth of data which is protected and managed by shared protection servers. In order to provide the ability to locate the data based upon content of the data, content indexing technology is often utilized.

To deduce redundancy and reduce work load, indexing of global single instance backup data may be used. That is, a backup operation will maintain only one backup copy of a data item, and the data item may also be indexed using content indexing technology to create an entry in an index database. Any subsequent backup operation of the same data item will not create duplicated backup copies for the data item. However, traditional content indexing for backup data is achieved by traversing a complete backup item (e.g., a whole file) and creating a central content index. Content indexing is a very processor and memory intensive operation. This operation must be carried out for every backup item received for each client. Additionally, storage space for the backed up data is significant. Further, backup data needs to be transferred back and forth between different machines. Enormous amount of network bandwidth is thus consumed for backup and indexing operations.

In view of the foregoing, it may be understood that there are significant problems and shortcomings associated with current methods of indexing backup data.

SUMMARY OF THE DISCLOSURE

Techniques for global single instance segment-based indexing are disclosed. In one particular exemplary embodiment, the techniques may be realized as a method for global single instance segment-based indexing for backup data. The method may comprise dividing an item being backed up into segments, generating a fingerprint for each segment, and saving an entry for each segment in an index database. Each entry may comprise the fingerprint for the segment.

In accordance with other aspects of this particular exemplary embodiment, the fingerprint for a segment may be an identifier in a backup catalog.

In accordance with further aspects of this particular exemplary embodiment, the fingerprint may be a unique identifier in the indexing database.

In accordance with additional aspects of this particular exemplary embodiment, the fingerprint may be a content hash of the segment.

In accordance with still further aspects of this particular exemplary embodiment, the entry for each segment may comprise a resource list. the resource list comprises a resource name and a resource count. Further, saving an entry for each segment in the index database may comprise determining the entry for the segment already exists, determining the resource name already exists, and increasing the value for the reference count by one. Alternatively, saving an entry for each segment in the index database comprises, determining the entry for the segment does not exist, inserting the entry for the segment in the index database, and adding the resource name to the resource list. Additionally, the method may further comprise setting the value for the reference count as one. Moreover, saving an entry for each segment in the index database may comprise determining the entry for the segment already exists, determining the resource name does not exist, adding the resource name to the resource list, and setting the value for the reference count as one.

In accordance with still additional aspects of this particular exemplary embodiment, dividing an item being backed up into segments may comprise parsing the item to detect structural boundaries, and dividing the item by boundaries into segments. Further, the structural boundaries may be syntactic boundaries.

In accordance with yet further aspects of this particular exemplary embodiment, dividing an item being backed up into segments may comprise padding at least one of the segments to make the at least one of the segments syntactically correct.

In accordance with yet additional aspect of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as a system for performing global single instance segment-based indexing for backup data. The method may comprise means for dividing an item being backed up into segments, means for generating a fingerprint for each segment, and means for saving an entry for each segment in an index database. Each entry may comprise the fingerprint for the segment.

In accordance with other aspects of this particular exemplary embodiment, the fingerprint may be a unique identifier in the indexing database.

In accordance with further aspects of this particular exemplary embodiment, the fingerprint may be a content hash of the segment.

In accordance with additional aspects of this particular exemplary embodiment, means for dividing an item being backed up into segments may further comprise means for parsing the item to detect structural boundaries. The structural boundaries may be syntactic boundaries. Moreover, means for dividing an item being backed up into segments may be configured to pad at least one of the segments to make the at least one of the segments syntactically correct.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
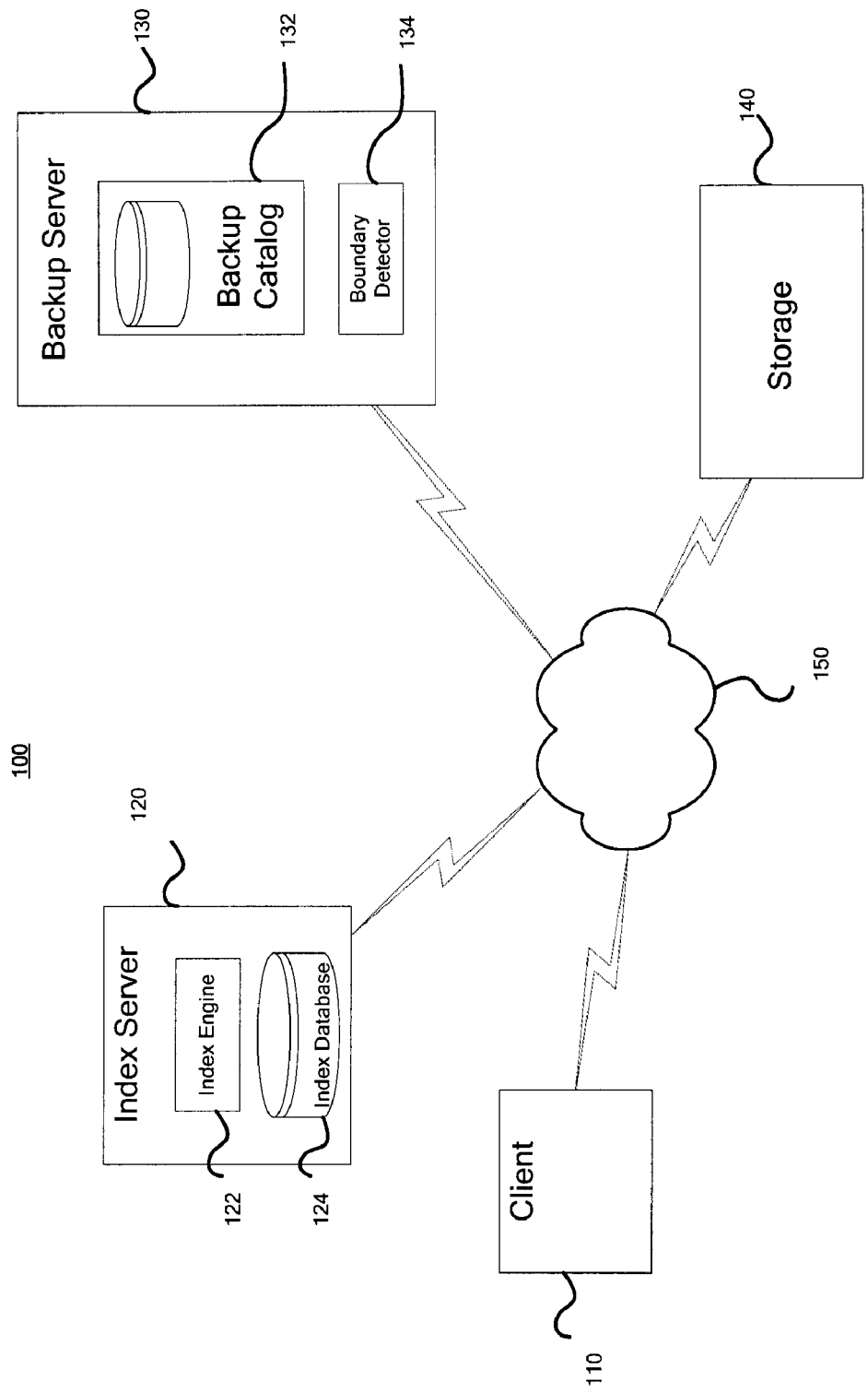
FIG. 1 shows a system for global single instance segment-based indexing for backup data in accordance with an embodiment of the present disclosure.

Referring to FIG. 1, there is shown a system 100 for global single instance segment-based indexing for backup data in accordance with an embodiment of the present disclosure. Client 110 may represent a computing device containing data that needs backup. Backup server 130 may be operatively connected to network 150 and may manage backup operations for one or more clients (e.g., Client 110) on network 150. A boundary detector 134 may be contained on the backup server 130. The boundary detector 134 may be a software module adapted to be invoked during a backup operation. A backup catalog 132 may be maintained on backup server 130. Backup catalog 132 may keep records of backup images of data items. Backup server 130 may use storage 140 to store backup images. Storage 140 may be a storage-area network, a raid array, a tape drive, a disk drive, or other storage devices.

Index server 120 may be operatively connected to network 150. Index server 120 may comprise an index engine 122 and an index database 124. In one exemplary embodiment, index engine 122 and index database 124 may be contained on backup server 130. In another exemplary embodiment, index engine 122 and index database 124 may be contained on the client 110.

In one or more exemplary embodiments, each backup data item (e.g., a file) may be divided into a plurality of segments and each segment may be treated as a backup unit. Index server 120 may work with backup server 130 to create entries for the index database 124. The index database 124 may contain a global single instance for each back up unit (e.g., each segment). That is, each backup item may be divided into multiple segments during a backup operation. Moreover, each segment of the backup items may have only one entry in the index database 124 and may be contained in only one backup image.

Identical sections may be contained in more than one files. A segment may be a logical or semantic section within a document. For example, two people may work on two versions of a document. The two versions of the document may have one or more identical sections contained inside the documents. Multiple backup operations on files containing identical segments may be carried out. The multiple backup operations may be backup operations for different machines, or for different directories, or for a same location but at different times. In one or more exemplary embodiments, only one entry may be generated for the segment in the index database 124 and only one backup image may be created to contain the segment. Therefore, although one segment may be contained in one or more backup items (e.g., files) and the one or more backup items may have duplicate copies from different locations of one client machine (e.g., Client 110) or multiple client machines, only one copy of one identical segment may be indexed and backed up.

In one or more exemplary embodiments, the backup data item may be a file. For example, a backup data item may be an Extensible Markup Language (XML) file, a Word document, a plain text file, an image file, a HTML file, an audio file, a video file, or a binary executable file. The file may have duplicate copies on multiple machines, or in different directories of one machine. By breaking the backup data item into smaller units (e.g., segments), indexing of global single instance backup data may be applied to the segments instead of the whole backup data item.

The global single instance for a segment of a backup data item in the index database 124 may be generated when backup server 130 performs a backup operation on a client machine (e.g., Client 110). Backup server 130 may identify each data item that needs backup and invoke the boundary detector 134. Because each data item may have a certain structure associated with the type of the data item (e.g., file, email), the boundary detector 134 may detect logical or syntactical boundaries within a data item between adjacent sections. For example, a plain text file may have paragraphs and/or pages. An XML file may have a structured content (e.g., nodes, sub-nodes, content, attributes). A word document may have metadata and content sections. The boundary detector 134 may parse each backup data item to detect logical and/or syntactical boundaries inside the item and divide the item into logical and/or syntactic segments.

In one or more exemplary embodiments, the boundary detector 134 may perform padding to logically or syntactically complete a segment. For example, an XML file may be divided into a plurality of sections. One or more nodes may start in one section and end in a different section. The syntax of XML may require that a starting tag and ending tag be located in one self-contained unit (e.g., a segment). In this example, the boundary detector 134 may detect missing tags and complete the segment by padding or inserting tags at an appropriate position. Since only the tags may be padded or inserted, the content is not affected, and thus the indexing of the content may not be affected.

To facilitate indexing and storage, a fingerprint for each segment may be generated each time a data item is broken up into segments. In one or more exemplary embodiments, the task may be accomplished by the boundary detector 134. The fingerprint may be a content hash for the segment. The fingerprint may be unique and may be used as an identifier in the index database 124. The identifier (e.g., the fingerprint) may also be saved as part of a record for the segment in the backup catalog 132. Backup server 130 may further provide a resource name for the segment during a backup operation. The resource name may be a file name and an offset of a starting position inside the file (e.g., document one+1024 bytes).

It should be noted that in one or more exemplary embodiments, the boundary detector 134 may be maintained on the index server 120, or the backup server 130, or any other server communicatively connected to the index server 120. Further, the boundary detector 134 may be implemented in one or more software modules and may be invoked for purposes other than backup or indexing (e.g., inspect a file for syntactic bounds for other purposes). In one exemplary embodiment, the boundary detector 134 may be a software module adapted to plug into modules performing backup operations. In another exemplary embodiment, the boundary detector 134 may be a software module adapted to plug into the index engine 120. In yet another exemplary embodiment, the boundary detector 134 may be a software module capable of functioning independently from the backup operations and/or index engine 120.

In one or more exemplary embodiments, the fingerprint for each segment may be computed when each segment is created. The backup server 130 may then communicate the fingerprint to the index server 120. The system 100 may direct the index engine 122 to use the fingerprint of the segment to determine whether an entry for the segment is already in the index database 124. A search of the index database 124 may be performed for the fingerprint. If an entry for the segment is not found in the index database 124, a backup image containing the segment may be generated and the backup catalog 132 may be updated for the backup image. Then the index engine 122 may generate an entry in the index database 124 for the segment. The fingerprint may be part of a data schema saved for the entry. The data schema may further comprise a resource name (e.g., file name plus an offset) and a corresponding reference count associated with the resource name. The resource name may be saved as a part of a resource list. A corresponding reference count may be used to track how may times an identical segment with the resource name have been backed up and indexed. The data schema, the resource list, the resource name and the reference count will be described in detail below.

If an entry for the segment is found in the index database 124, the index engine 122 may update the existing entry for the segment. For example, a previous backup operation may have already generated a backup image containing the segment, thus an entry for the segment may have already been saved in the index database 124. The previous backup operation may be a backup operation for the same file. Then the resource name (e.g., file name plus offset) may be already in the resource list, and the index engine 122 may increase the reference count by one. If the previous backup operation was performed on a different back data item, the resource name (e.g., file name plus offset) may not be in the resource list for the existing entry. Then the index engine 122 may insert the resource name in the resource list and set a reference count associated with the resource name to one.

In one or more exemplary embodiments, if a segment is found in the index database 124 (e.g., by matching the fingerprint), a backup image containing the segment need not be created and the content of the segment need not be indexed. That is, matching an existing fingerprint in the index database 124 shows that the segment has already been backed up and indexed, therefore, duplicate copies for the segment need not be created. Thus, a global single instance of the segment-based indexing for backup data may be achieved. Also, storage space on storage 140 may be preserved because no duplicate copies of the segment need to be backed up. Network bandwidth may be saved because no duplicate backup data need be sent to the storage 140. Moreover, resources of the index engine 122 may be saved. It should be noted that the backup catalog 132 may also be used to store segment entries by fingerprint and perform searching/matching of fingerprints.

Figure 2:
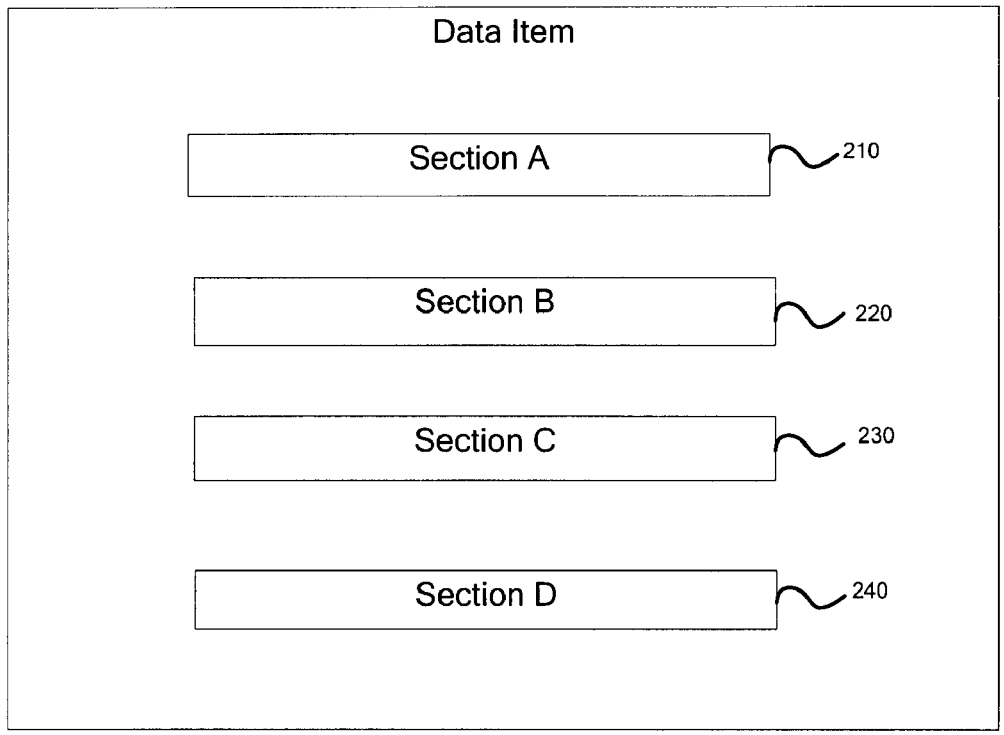
FIG. 2 shows a schematic view of a data item with multiple sections in accordance with an embodiment of the present disclosure.

Referring to FIG. 2, there is shown a schematic view of a data item 200 with multiple sections in accordance with an embodiment of the present disclosure. The data item 200 may contain a plurality of sections: section A (210), B (220), C (230) and D (240). It should be noted that in one or more exemplary embodiments, a data item may have less or more sections.

In one or more exemplary embodiments, the data item 200 may be a file. The sections may be content sections inside the file. Each section may be of equal size or different size. For example, the data item 200 may be a text document, and each section may be one or more paragraphs inside the text document.

In another example, the data item 200 may be an XML file, whose content has a structure that complies with an XML structural requirement. In this case, the sections may be determined by the syntax of the content (e.g., the boundary may be determined by certain nodes of the XML structure). In the examples above, each section may also be of equal size, thus the boundary of the section may not follow the syntactic boundaries of content (e.g., paragraphs, nodes).

Using the system 100 of FIG. 1, the data item 200 may be broken up into 4 segments corresponding to the sections A to D. In one exemplary embodiment, a segment may be identical to the corresponding section found in the data item. In another exemplary embodiment, a segment may be based on the corresponding section found in the data item but padded to make the segment syntactically correct. Padding of a segment will be described in detail below. A fingerprint for each segment may be generated once the segment is created (e.g., a content hash may be generated). Thus, each segment may be backed up and indexed independently from other segments from the same file.

As described previously, the fingerprint of each segment may be used to identify whether the segment has been backed up and indexed before. Therefore, by breaking the data item 200 into smaller backup units, greater granularity may be achieved.

In one exemplary embodiment, the sections A, B, C and D may be formulated along syntactically correct boundaries of the document (e.g., sentences, paragraphs, pages, nodes of XML structure). In this embodiment, each section may be in a syntactically correct format (e.g., no broken sentence, no broken paragraph, no broken nodes) and each section may be turned into a segment with identical content.

In another exemplary embodiment, the sections A, B, C and D may be formulated by size and may be formulated logically incorrect. That is, for example, the data item 200 may be a Word document, section B may begin in the middle of a sentence and end in the middle of a paragraph. For content indexing, however, the content of section B may be syntactically correct. That is, the content may be still in compliance with the format for text. In this embodiment, each section may also be turned into a segment with identical content.

In yet another exemplary embodiment, the sections A, B, C and D may be syntactically incorrect. In this embodiment, padding may be needed for a segment based on one of the sections. That is, additional text may be added at the start and/or the end to complete a segment. For example, the data item 200 may be an XML file. However, the four sections of data item 200 may be formulated by equally dividing the XML file. Section B may start at the middle of a tag and end at the middle of content of a node. Thus, section B may contain an incomplete XML structure, and therefore may be syntactically incorrect. To facilitate indexing of content of an XML structure, padding may be needed. A broken tag may be fixed at the beginning, and a closing tag may be added at the end. It should be noted that in one or more exemplary embodiments, padding may be determined by the capabilities and requirements of the index engine 122, because the index engine 122 may specify a format for a type of file to be indexed.

Figure 3:
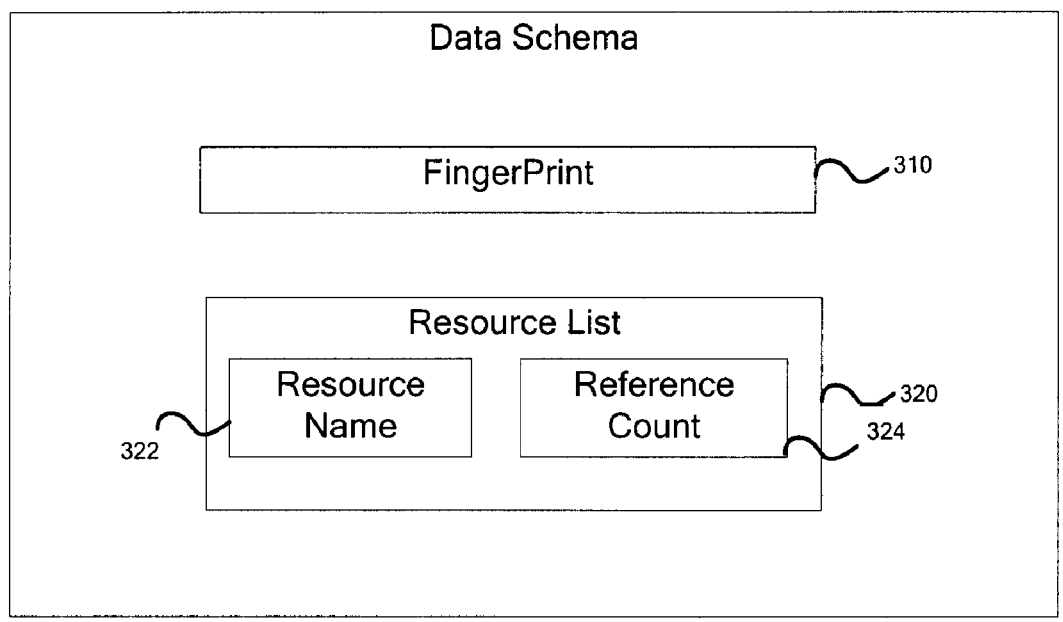
FIG. 3 shows a schematic view of data schema comprising a fingerprint in accordance with an embodiment of the present disclosure.

Referring to FIG. 3, there is shown a schematic view of data schema 300 comprising a fingerprint in accordance with an embodiment of the present disclosure. In addition to a fingerprint 310, the data schema 300 may also comprise a resource list 320. The resource list 320 may comprise a resource name 322 and a reference count 324. The reference count 324 may be referred to as a reference count associated with the resource name 322. The reference count 324 may record the number of references to the resource name 322.

The resource list 320 may contain multiple resource names because one segment (e.g., one fingerprint) may be found in multiple data items. For example, a segment may be a block of a Word document, the same block may be in different versions of the same document on one or more client machines, or the same block may be in different Word documents, or the same block may be found in different textual documents.

As described previously, when a segment is created during a backup operation, a fingerprint may be generated for the segment. In one exemplary embodiment, the fingerprint may be searched in the index database 124. If there is a match, an entry with the same fingerprint is already recorded in the index database 124. If the resource name is the same (e.g., same file+same offset), the reference count for the entry may be increased by one. If the resource name is different, the new resource name may be added to the resource list and a corresponding reference count may be set to one. In one or more exemplary embodiments, if the resource name is different, another entry with the same fingerprint may be recorded in the index database 124. In these exemplary embodiments, there may be multiple entries having the same fingerprint.

In one exemplary embodiment, one backup data segment may only have one entry in the index database 124. In this embodiment, a fingerprint for a segment may be used as a unique identifier for the entry. A resource list with a plurality of resource names and corresponding reference counts may be used for different resources. Thus, duplicated entries for backup data items may be avoided. Also, scalability of the index database 124 may be improved, which may lead to improved performance of the index engine 122. Further, applications of indexing technology on enterprise backup technology may be enhanced.

Figure 4:
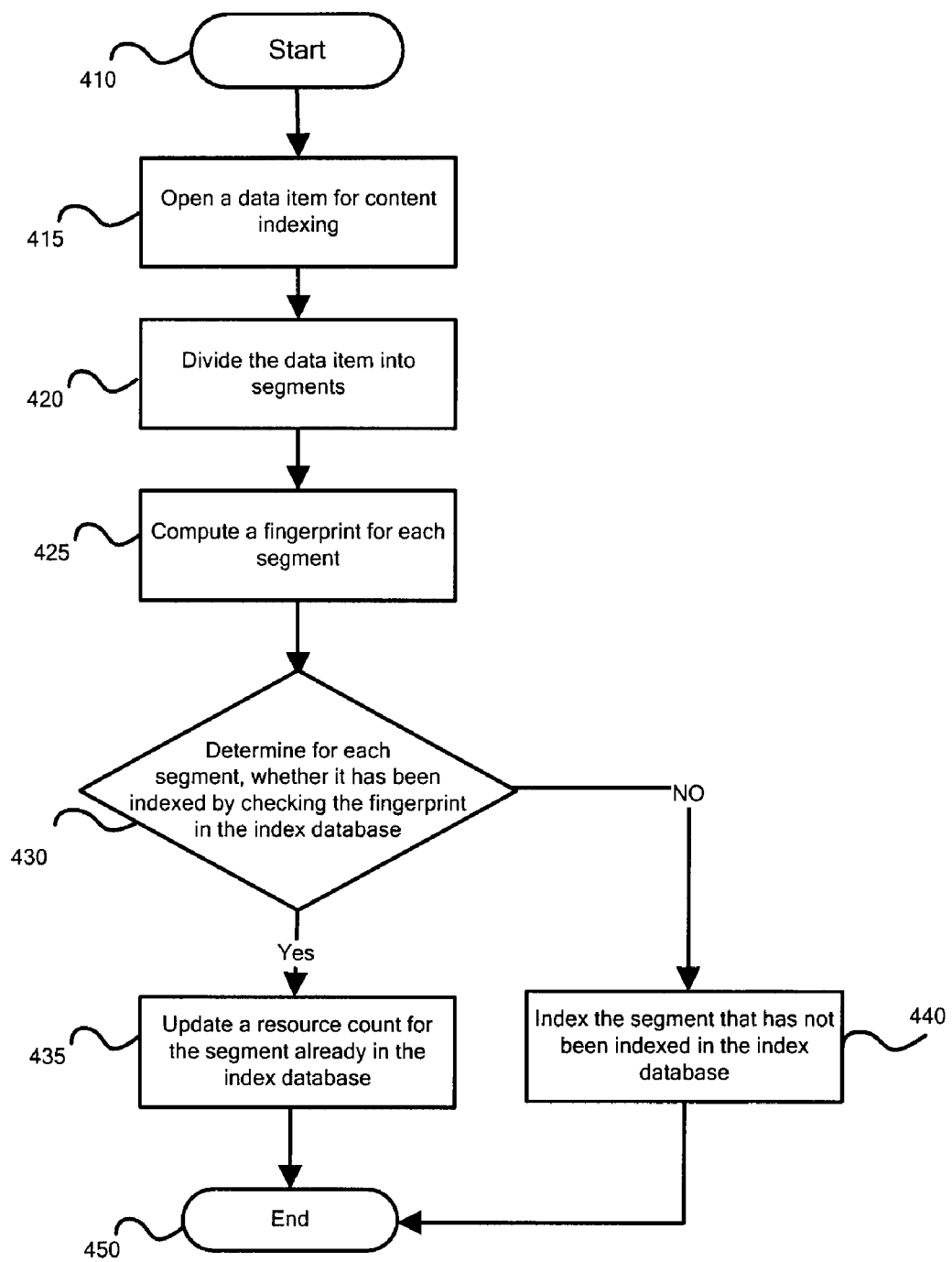
FIG. 4 shows a flow chart illustrating a process for updating a global single instance segment-based index database in accordance with an embodiment of the present disclosure.

Referring to FIG. 4, there is shown a method 400 for updating a global single instance segment-based index database in accordance with an embodiment of the present disclosure. Method 400 may start at block 410. At block 415, the method may open a data item for content indexing. The data item may be a file that needs to be backed up. At block 420, the method may divide the data item into segments. As previously described, a data item may be divided into a plurality of sections. Each section may be turned into a corresponding segment. A segment may be padded such that the content of the segment may be syntactically correct. At block 425, the method may compute a fingerprint for each segment. The fingerprint may be able to uniquely identify a segment. For example, content hash may be used as a fingerprint for a segment. At block 430, the method may determine whether each segment has been indexed by checking the fingerprint in the index database. If yes, the method may continue to block 435. At block 435, the method may update a resource count for the segment already in the index database. Then the method may end at block 450. If at block 430, the method determines a segment has not been indexed in the indexing database, the method may continue to block 440. At block 440, the method may index the segment that has not been indexed in the index database. Then the method may proceed to block 450 and end.

At this point it should be noted that the techniques for global single instance segment-based indexing for backup data in accordance with the present disclosure as described above typically involves the processing of input data and the generation of output data to some extent. This input data processing and output data generation may be implemented in hardware or software. For example, specific electronic components may be employed in a computer processor or similar or related circuitry for implementing the functions associated with file creation, transfer, deletion, or network communication in accordance with the present disclosure as described above. Alternatively, one or more processors operating in accordance with stored instructions may implement the functions associated with file creation, transfer, deletion, or network communication in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

The invention claimed is:

1. A method for performing global single instance segment-based indexing for backup data comprising:
parsing a non-executable data item being backed up to detect one or more syntactic boundaries within the non-executable data item being backed up between adjacent sections;
dividing, using at least one computer processor, the non-executable data item being backed up into segments using the one or more detected syntactic boundaries, wherein dividing the non-executable data item being backed up into segments comprises padding at least one of the segments to make the at least one of the segments syntactically correct by completing the at least one of the segments according to a type of file to be indexed, and wherein the at least one of the segments comprises at least one of: an XML node, a sentence, a paragraph, and a page, wherein segmentation is performed for a plurality of different types of syntactical boundaries including paragraphs and at least one of: an XML node, a sentence, and a page and wherein padding is based at least in part on a format, received from an index engine, for a type of file to be indexed;
generating a fingerprint for each segment; and
saving an entry for each segment in an index database, wherein each entry comprises a resource list and the fingerprint for the segment, the resource list comprising a resource name and a reference count, wherein the reference count is configured to allow counting of a plurality of references to the resource name.

2. The method of claim 1, wherein the fingerprint for a segment is an identifier in a backup catalog.

3. The method of claim 1, wherein the fingerprint is a unique identifier in the indexing database.

4. The method of claim 1, wherein the fingerprint is a content hash of the segment.

5. The method of claim 1, wherein saving an entry for each segment in the index database comprises:
determining the entry for the segment already exists; determining the resource name already exists; and
increasing the value for the reference count by one.

6. The method of claim 1, wherein saving an entry for each segment in the index database comprises:
determining the entry for the segment does not exist;
inserting the entry for the segment in the index database; and
adding the resource name to the resource list.

7. The method of claim 6, further comprising setting the value for the reference count as one.

8. The method of claim 1, wherein saving an entry for each segment in the index database comprises:
determining the entry for the segment already exists;
determining the resource name does not exist;
adding the resource name to the resource list;
and setting the value for the reference count as one.

9. At least one non-transitory computer processor readable storage medium for storing a computer program of instructions configured to be readable by at least one processor for instructing the at least one processor to execute a computer process for performing the method as recited in claim 1.

10. The method of claim 1, wherein the resource list comprises a plurality of resource names, at least one resource name associated with a reference count greater than 1.

11. A system for performing global single instance segment-based indexing for backup data comprising:
a boundary detector module for parsing a non-executable data item being backed up to detect one or more syntactic boundaries within the non-executable data item being backed up between adjacent sections;
the boundary director module further configured to divide the non-executable data item being backed up into segments using the one or more detected syntactic boundaries and to generate a fingerprint for each segment, wherein dividing the non-executable data item being backed up into segments comprises padding at least one of the segments to make the at least one of the segments syntactically correct by completing the at least one of the segments according to a type of file to be indexed, and wherein the at least one of the segments comprises at least one of: an XML node, a sentence, a paragraph, and a page, wherein segmentation is performed for a plurality of different types of syntactical boundaries including paragraphs and at least one of: an XML node, a sentence, and a page and wherein padding is based at least in part on a format, received from an index engine, for a type of file to be indexed; and
electronic storage for saving an entry for each segment in an index database, wherein each entry, comprises a resource list and the fingerprint for the segment, the resource list comprising a resource name and a reference count, wherein the reference count is configured to allow counting of a plurality of references to the resource name.

12. The system of claim 11, wherein the resource name comprises a file name and an offset.

13. The system of claim 11, wherein the syntactic boundaries comprise at least one of: an XML node, a sentence, a paragraph, and a page.

14. The system of claim 1, wherein padding comprises fixing tags of a syntactically incorrect XML structure.

15. A non-transitory article of manufacture for performing global single instance segment-based indexing for backup data, the article of manufacture comprising:
at least one non-transitory processor readable medium; and
instructions stored on the at least one medium;
wherein the instructions are configured to be readable from the at least one medium by at least one processor and thereby cause the at least one processor to operate so as to:
parse a non-executable data item being backed up to detect one or more syntactic boundaries within the non-executable data item being backed up between adjacent sections;
divide the non-executable data item being backed up into segments using the one or more detected syntactic boundaries, wherein dividing the non-executable data item being backed up into segments comprises padding at least one of the segments to make the at least one of the segments syntactically correct by completing the at least one of the segments according to a type of file to be indexed, and wherein the at least one of the segments comprises at least one of: an XML node, a sentence, a paragraph, and a page, wherein segmentation is performed for a plurality of different types of syntactical boundaries including paragraphs and at least one of: an XML node, a sentence, and a page and wherein padding is based at least in part on a format, received from an index engine, for a type of file to be indexed;
generate a fingerprint for each segment;
and save an entry for each segment in an index database, wherein each entry comprises a resource list and the fingerprint for the segment, the resource list comprising a resource name and a reference count, wherein the reference count is configured to allow counting of a plurality of references to the resource name.

16. The article of manufacture of claim 15, wherein the fingerprint for a segment is a unique identifier for the segment.

17. The article of manufacture of claim 15, wherein the fingerprint for a segment is content hash of the segment.

* * * * *